United States Patent [19]

Nicholson

[11] Patent Number: 5,697,719
[45] Date of Patent: Dec. 16, 1997

[54] CLEANSING OF BLADES

[76] Inventor: Stephen S. Nicholson, 342 Pillings Pond Rd., Lynnfield, Mass. 01940-1345

[21] Appl. No.: 570,302

[22] Filed: Dec. 11, 1995

[51] Int. Cl.⁶ .................... B05B 11/04; B05C 17/00
[52] U.S. Cl. .................. 401/10; 401/14; 401/48; 401/131; 401/123; 401/140; 401/196; 401/183
[58] Field of Search ..................... 401/9–11, 14, 401/48, 140, 156, 183, 186, 196, 123, 131

[56] References Cited

U.S. PATENT DOCUMENTS

| 2,101,132 | 12/1937 | Daley et al. | 401/10 X |
| 2,811,732 | 11/1957 | Okamoto | 401/10 X |
| 3,056,998 | 10/1962 | Ebner | 401/9 X |
| 3,109,192 | 11/1963 | Levenson | 401/10 X |
| 3,352,623 | 11/1967 | Sanet | 401/10 X |
| 5,123,764 | 6/1992 | Duncan et al. | 401/10 |

FOREIGN PATENT DOCUMENTS

| 4010710 | 12/1990 | Germany | 401/9 |

*Primary Examiner*—Danton D. DeMille
*Attorney, Agent, or Firm*—George E. Kersey, Esq.

[57] ABSTRACT

A section of sponge-like cleaning material partially enclosed within a rigid casing to form a cleaning surface that is contoured to simultaneously contact the edge and sides of a windshield wiper blade; being movable back and forth along the length of a wiper blade by a hollow handle that can be used to store cleansing fluid directly or in a squeeze-type dropper.

18 Claims, 2 Drawing Sheets

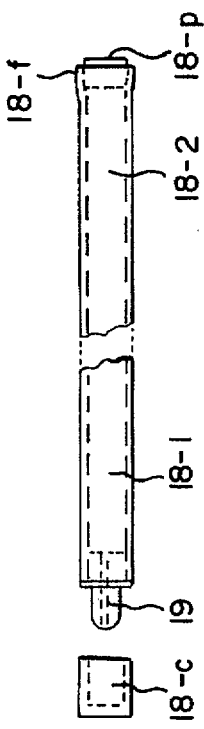
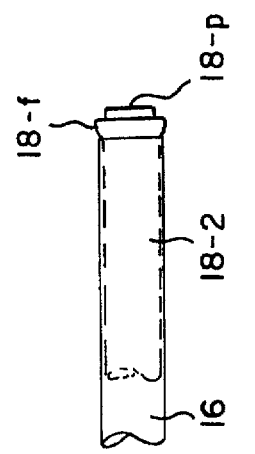
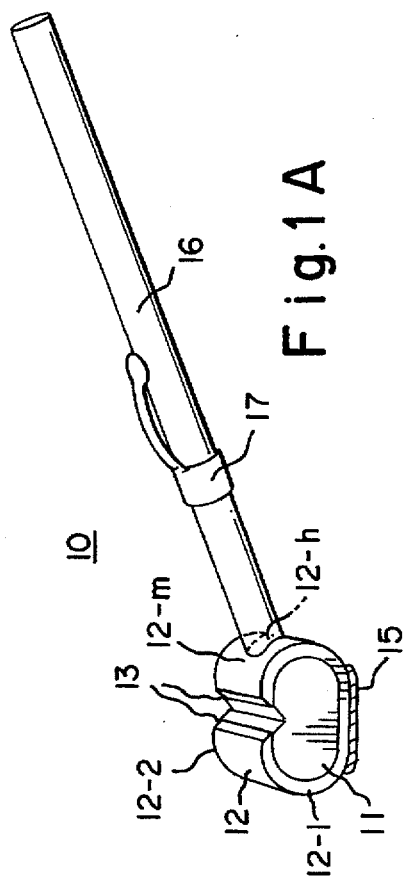
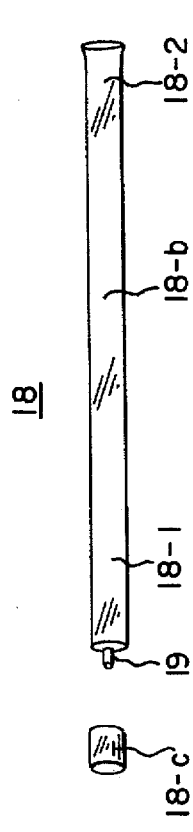
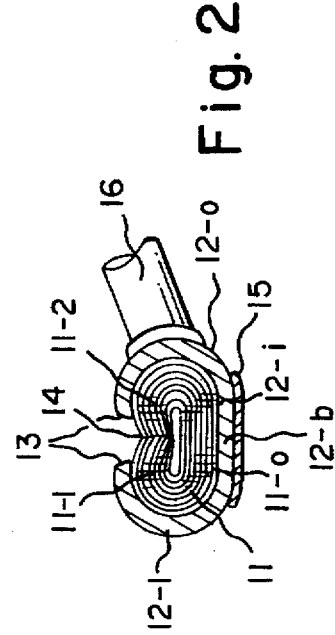

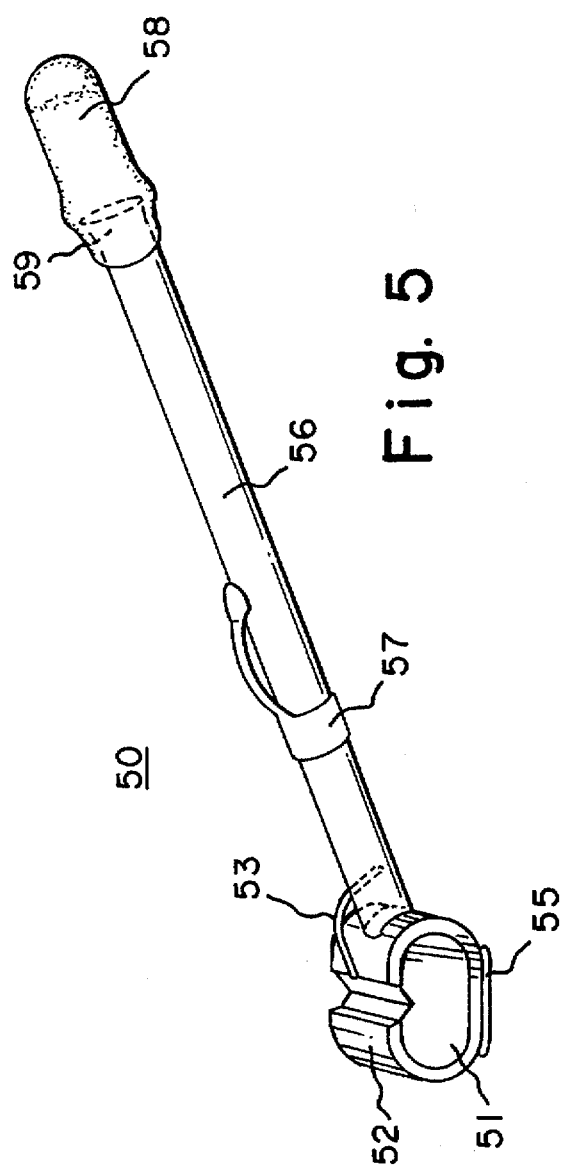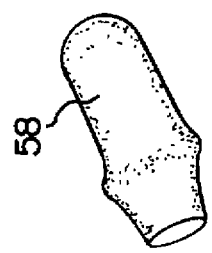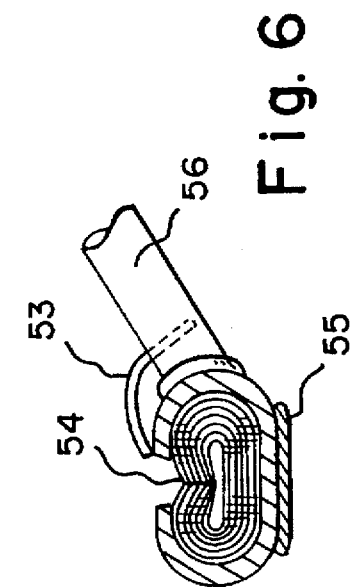

5,697,719

CLEANSING OF BLADES

BACKGROUND OF THE INVENTION

1. Field of the Invention

This invention relates to cleansing of devices, and, more particularly to the cleansing of blades such as those associated with windshield wipers.

2. Description of the Prior Art

Blades for uses such as the wiping of windshields tend to lose their effectiveness after they become dirty and contaminated. The result can be incomplete blade action, which, in the case of a windshield, produces incomplete wiping and reduced visibility. In addition, blades that are not properly and regularly cleaned tend to deteriorate more rapidly than those which are properly cleaned. This is particularly true for blades made from elastomers such as rubber. The consequence is a significantly shorter blade life span.

The most common method of cleaning wiper blades is to run a cloth or rag along surface contacting edges. This removes some dirt and contamination from the blade contacting areas, but it rarely removes all. Also, if the removal is not done carefully, the blades can be permanently damaged. Excessive pressure, abrasive material and non-parallel stroking can cause removal or cracking of blade material. This may result in premature blade replacement.

Another method for cleaning the contacting edges of wiper blades is to have each blade move over a cleaning fixture, which can be in the form of a thin layer either permanently or temporarily attached to the surface being wiped. This method has the disadvantage of requiring the cleaning fixture to be attached to the windshield, and has to be regularly cleaned or replaced, with resulting inconvenience. There is the further objection that this procedure can reduce the useful life of the wiper blade being cleaned due to excess wear and contact with the blade.

Furthermore, a cleaning fixture that is permanently mounted on a windshield may partially obstruct the view through the windshield. If the cleaning fixture is temporarily mounted, there is inconvenience because of required storage until needed, followed by attachment to the windshield and cycling of the wiper between "on" and "off" conditions in order to obtain suitable contact between the cleaning fixture and the blade being cleaned. After a number of cycles, it is necessary to remove the fixture from the windshield and place it in storage until again needed. Since windshield wipers are used mostly during adverse or undesirable weather conditions, an operator could be unnecessarily exposed while undertaking this procedure.

Accordingly, it is a principal object of the present invention to facilitate the cleansing of blades, particularly the windshield contacting areas of windshield wiper blades.

Another object of the invention to provide for the simple and inexpensive cleansing of blades, particularly those used for wiping surfaces.

A further object is to provide a blade cleansing device of a size, shape and weight that allows ease of use and convenience in storage when the blade cleansing device is not in use.

A yet further object is to provide a blade cleansing device which, in use, will prolong the useful life span of the blades being cleaned, particularly windshield wiper blades.

Still another object is to reduce the loss in effectiveness of blades that are subject to becoming dirty and contaminated. A related object is to avoid incomplete wiping and reduced visibility with respect to the wiped surface. Another related object is to achieve simplified and proper cleansing on a regular basis to avoid deterioration, particularly for blades that are made from elastomers such as rubber. A related object is to achieve a significantly longer life span for such blades.

Another object is to overcome the objection to the most common method of cleaning wiper blades by running a cloth or rag along the surface contacting edge of the blade to remove some dirt and contamination, but rarely removing all such contamination and dirt from the blade contacting area.

A still further object is to achieve careful removal of dirt and contamination to avoid blade damage. A related object is to achieve suitable removal of dirt and contamination without excessive pressure, abrasive material and non-parallel stroking that can cause removal or cracking of blade material. Another related object is to avoid resulting damage that may require premature blade replacement.

Yet another object is to avoid the need for having the blade move over a cleaning fixture, either permanently or temporarily attached as a thin layer to a surface being cleaned. A related object is to avoid the disadvantage of requiring the cleaning fixture to be attached to the windshield, and require regular cleaning or replacement, with resulting inconvenience. Another related object is to avoid reduction in the useful life of the wiper blade being cleaned due to excess wear and contact with the blade.

A still further object is to avoid the need for permanent mounting of a cleaning fixture which may partially obstruct the view through a windshield. Also avoided by the invention is a cleaning fixture that is temporarily mounted, which may cause inconvenience because of required storage until needed, followed by attachment to the windshield while a wiper circuit is being cycled between "on" and "off" conditions in order to obtain suitable contact between the cleaning fixture and the blade being cleaned. There is further avoidance, after a number of cycles, of the necessity to remove the fixture from the windshield and place it in storage until again needed.

Further, since windshield wipers are mostly used in adverse or undesirable weather conditions, it is another object of the invention to avoid subjecting an operator to unnecessarily prolonged exposure to such weather conditions while undertaking a cleaning procedure.

SUMMARY OF THE INVENTION

In accomplishing the foregoing and related objects the invention provides blade cleaning material and a remotely controllable holder for the blade cleaning material. The blade cleaning material is moisture absorbent and the holder forms and exposes the blade cleaning material.

In accordance with one aspect of the invention the remotely controllable holder is connected to a handle so that the blade cleaning material can manually be positioned against the windshield contacting area of a wiper blade and manipulated along the length of the wiper blade.

In accordance with another aspect of the invention the blade cleaning material contains a groove for contacting a blade with a general "V" shape in a top cleaning surface of the cleaning material to allow for simultaneous contact between the cleaning material and the windshield contacting edge and sides of a wiper blade.

In accordance with other aspects of the invention, the holder is prevented from scratching the windshield because of holder contact; the blade cleaning material is removable and replaceable; provision is made for storing and dispensing fluid, for example directly in a hollow handle for the holder, or in a squeezable liquid dropper formed to fit inside the handle. A cap can prevent leakage and evaporation of fluid from within the handle or dropper when not in use; and the device can be temporarily attached for storage.

In a method of the invention for cleansing a blade the steps include (a) providing blade cleaning material; (b) holding the blade cleaning material, and (c) remotely controlling the blade cleaning material. The blade cleaning material can be provided with moisture absorbency and further including the steps of exposing the blade to the blade cleaning material and remotely controlling the blade cleaning material so that it can be manually positioned against the windshield contacting area of a wiper blade and manipulated along the length of the wiper blade.

In accordance with one aspect of the method, a further step is to groove the blade cleaning material for enhancing contact of the material with the blade. The cleaning material can be grooved with a "V" shape to allow simultaneous contact between the cleaning material and the windshield contacting edge and sides of a wiper blade.

The method can further include the step of storing and dispensing fluid in a handle for holding the cleaning material.

The cleaning material desirably is a non-abrasive porous section of, for example, a sponge, partially enclosed by a rigid outer casing which is attached to a tubular handle.

It is preferred that the casing be formed from a slightly flattened segment of tubing, such as aluminum, with open ends, and an opening running along the length of the segment and sufficiently wide that it allows the edge of a blade to easily enter the tubing into contact with the sponge.

The sponge section of non-abrasive porous material fits securely within the tubing with at least an exposed end. The tubing casing segment and sponge form the head assembly of the device. Attached to the casing is a handle, desirably tubular, which extends perpendicularly with respect to the length of the casing and sponge assembly. The handle permits remote access to the blade being cleaned. The head of the resulting tool can be placed under a wiper blade with a blade edge in contact with the sponge along the lengthwise opening in the tubing segment. By use of the handle, the head can be moved back and forth along the wiper blade to remove contamination and dirt from windshield contacting areas of the blade.

In accordance with a further aspect of the invention, a dropper is provided for holding and the dispensing of moistening and cleaning fluid for the section of sponge. The dropper can be either a separate piece from the device or incorporated into it. When separate, the dropper is a length of flexible tubing, closed on one end with a nipple on the opposite end. The dropper tubing is flared on one end and has a length and outer diameter that are smaller than the corresponding dimensions of the device tubular handle. This shape of the dropper allows it to be conveniently stored within the device handle when not in use. Alternatively, the dropper can be permanently incorporated into the body of the device, with the hollow handle serving as a reservoir for the cleaning fluid. A capillary tube runs from the inner diameter of the handle near the head of the device to the cleaning surface of the sponge. The other end of the handle is flared slightly and fitted with a removable and squeezable elastomeric bulb.

When the bulb is squeezed, fluid from inside the handle is forced out of the capillary tube onto the cleaning surface of the sponge.

BRIEF DESCRIPTION OF THE DRAWINGS

Other aspects of the invention will become apparent after considering several illustrative embodiments, taken in conjunction with the drawings, in which:

FIG. 1A is a side perspective of a wiper blade cleaning device in accordance with the present invention;

FIG. 1B is a side perspective view of a dropper in accordance with the present invention;

FIG. 2 is a side cross-section elevation of the head of the device in FIG. 1A with a fragmentary bottom portion of the handle of the cleaning device;

FIG. 3 is a fragmentary side elevation showing the ends of the dropper of FIG. 1B;

FIG. 4 is a fragmentary side elevation of the top portion of the handle of the cleaning device with the dropper of FIGS. 3 and 1B in stored position;

FIG. 5 is a side perspective of an alternative blade cleaning device of the invention with a built-in fluid reservoir and dispenser;

FIG. 6 is a cross-section fragmentary side elevation of the head and bottom portion of the handle of the device of FIG. 5;

FIG. 7 is a fragmentary side elevation of the top portion of the handle of FIG. 5; and FIG. 8 is a side elevation of the squeeze bulb of the device of FIG. 5

DETAILED DESCRIPTION OF PREFERRED EMBODIMENTS

As shown in FIG. 1A, the windshield wiper blade cleaning device 10 of the invention includes a sponge 11 partially enclosed in a hard casing of a cleaning head 12. The casing is preferably a segment of metal tubing partially flattened into an oval shape. Both ends 12-1 and 12-2 of the tubing segment forming the head 12 are open, with only the end 12-1 visible in FIG. 1A. A third opening 13 in the head 12 extends along the length of the head 12.

The third head opening 13 is wide enough so that the windshield contacting edge of a wiper blade (not shown) can extend through the opening 13 into the interior of the head 12. The section of sponge 11 desirably is equal in length to the tube segment of head 12 and is advantageously compressed inside the tube segment.

As best seen in FIG. 2, the sponge preferably is compressed with ends 11-1 and 11-2 folded over so that when held in place by the casing of the head 12, a groove 14, illustratively having a "V" shape, is formed that will simultaneously contact the edge and sides of a wiper blade inserted through the lengthwise opening 13 in the casing of the head 12. The sponge 11 is held securely in place within the head 12 by friction between the outer wall 11-o of the sponge 11 and the inner wall 12-i of the the section of the head 12. This frictional effect will hold the sponge 11 in place during storage and use, but will allow for easy removal and replacement of the sponge 11 if its cleaning surface becomes contaminated or damaged.

A length of soft, non-abrasive material 15 is attached to the outer wall 12-o of the casing for the head 12 opposite the lengthwise opening 13. This material 15 can be self-adhesive felt or equivalent, and is equal in length and width to the flattened base 12-b of the casing head 12. The felt-like material 15 is to avoid scratching a windshield when there is contact of a blade (not shown) with the bottom of the device 10.

While the head 12, with the sponge 11, can be used to clean a blade, by holding the head 12 in a hand (not shown) in contact with a blade, it is desirable to use a handle 16, which can be removable and be formed from a segment of thin-walled metal tubing that is securely attached to the casing head 12 to serve both as a handle for the head 12, allowing remote access to the blade being cleaned, and a storage compartment for a dropper 18. The handle 16 protrudes from a middle side 12-m of the oval-shaped head 12 and is perpendicular to the lengthwise opening 13. The handle 16 angles upwardly away from the bottom flat area 12-b of the casing head 12. Preferably, the tubular handle 16 is removably and threadably or frictionally mounted in a hole 12-h in the casing. The diameter of the hole 12-h is approximately equal to the outer diameter of the tubular handle to afford a snug fit. The handle 16 can be bonded in place with a conventional adhesive, such as an epoxy or other appropriate synthetic or natural material.

A removable clip 17 is fitted on the handle 16 to provide easy storage for the device 10. The clip 17 will allow the device to be temporarily attached to a shirt pocket, automobile visor or other surface (not shown).

With reference to FIG. 1B, the dropper 18 included with the device 10 has a body 18-b which is a segment of hollow flexible tubing, preferably of nylon. As best shown in FIG. 4, the outer diameter of the flexible tubing 18 is slightly smaller than the inner diameter of the handle 16 of the blade cleaning device 10. One end 18-1 of the flexible tubing 18 is fitted with a dropper-type nipple 19 that can be bonded in place. The opposite end 18-2 of the flexible tubing 18 is fitted with a plug 18-p, that when put in place causes the end of the tubing to expand to a flare 18-f to a diameter slightly larger than that of the handle 16. The plug 18-p can also be bonded in place. A removable cap 18-c is formed from a short segment of flexible tubing which is closed on one end. The cap 18-c fits snugly over the protruding nipple 19 of the dropper 18, and can be held in place by friction. The overall length of the dropper 18 with the cap in place is slightly less than that of the handle 16. The dropper 18 is sized so that it can be stored inside the handle 16 of the wiper blade cleaning device 10, and is held in place by friction between outer diameter of the flare 18-f of flexible tube 18 and the inner diameter of the device handle 16.

The simple materials and construction described provide for a completely operational but inexpensive device. Preferably the entire device is small and light enough so that with the dropper 18 stored in the handle 16 of the device 10, it can be conveniently attached on or in an automobile, on one's person, or elsewhere. In a working model of the invention, the overall length of the device 10 was about 6 inches, with the handle 16 being about 5 inches long, ⅜ inch diameter, with a wall thickness of about 1/64 inch. The head 12 of the device 10 was about 1 inch by ½, forming a generally rounded rectangle about 1 inch in depth. The opening 13 running the length of the head 12 was about 3/16 inch in width. The length and diameter of the dropper 18 illustrated in FIG. 1B was slightly less than that of the handle 16, being about 4¾ inches in length by 5/16 inch diameter. The cap 18-c was about ⅜ inch in length and 5/16 inch in diameter. The plugged end 18-f of the dropper 18 was flared out to a diameter of about 7/16 of an inch.

In storage, the dropper 18 is filled with cleaning solution, preferably windshield washer fluid, and the cap 18-c is fitted over the nipple 19 to prevent evaporation of the fluid. In use, the cap 18-c is removed from the nipple 19 and solution is dispensed from the dropper 18 by squeezing flexible sides. As necessary, the dropper 18 is removed from the handle 16.

When the cleaning device 10 is held by the tubular handle 16, the head 12 of the device 10 can then be positioned so that the normally windshield contacting edge of a wiper blade is protruding through the lengthwise opening in the casing and contacting the cleaning surface of the sponge. The device is then moved back and forth several times along the length of the wiper blade, removing dirt and contamination from the windshield contacting areas of the wiper blade. For use on wiper blades mounted on an automobile, the wiper assembly can be lifted from the windshield, and the head of the device positioned under the blade. The wiper assembly is then let to rest so the normally windshield contacting edge of the blade is in contact with the cleaning surface of the device, and the non-abrasive material on the bottom of the device's head is in turn contacting the windshield. The device is then moved back and forth along the length of the wiper blade, using the normal pressure of the wiper against the windshield to provide pressure between the cleaning surface and the wiper blade.

When the cleaning surface of the device becomes dirty it can be rinsed clean with water or cleaning solution. The section of cleaning material is held in place by friction allowing it to be easily removed and replaced if excess contamination or damage occurs to the cleaning surface.

With use, the device effectively removes dirt and contamination from the windshield contacting areas of windshield wiper blades, without damaging the blades. The clean wiper blades afford complete wiping of the windshield, thus providing improved visibility through the windshield over contaminated or dirty wiper blades when in use during adverse or precipitous weather. With continued use the effective life span of wiper blades is prolonged through the removal of contaminants and abrasives that can cause blade damage when the wipers are both cycling and idle.

An alternative embodiment of the invention is the device 50 illustrated in FIGS. 5 through 8, in which a reservoir and dispenser for cleaning fluid are incorporated into the device 50. The body of the reservoir is the hollow handle 56 of the device 50, sealed at the end which connects to the head of the device 50. The parts 51, 52 and 54–57 correspond to the parts 11, 12 and 14–17 of FIG. 1A.

As shown in FIGS. 5 and 6 a section of flexible capillary tubing 53 protrudes from within the handle 56 near the connection between the handle 56 and head, through the wall of handle and down toward the cleaning surface of the sponge 54. The section of capillary tubing 53 is bonded in place with a conventional adhesive to seal the hole through which one end protrudes into the handle and keep the opposite end permanently directed toward the cleaning surface of the sponge.

The opposite end 59 of the tubular handle 56 is slightly flared and fitted with a removable squeeze bulb 58. The flare at the end 59 of the handle 56 prevents the squeeze bulb 58 from easily slipping off the handle during storage and use, but allows for the bulb 58 to be removed when necessary, for example when refilling the reservoir with fluid.

In the embodiment 50 illustrated in FIGS. 5 through 8 the dimensions can be similar to those described earlier, with the squeeze bulb 58 extending the overall length of the device 50 to about 6½ inches. In addition the end 59 of the handle 56 is flared to an outer diameter of about 7/16 of an inch. The section of capillary tubing 53 leading from the inner diameter of the handle to the surface of the sponge can be about ½ inch in length, with a 3/64 inch outer diameter and a 1/64 inch inner diameter.

The dropper squeeze bulb 58 preferably is semi-rigid about 1 inch in length with an opening diameter of about 5/16 inch to afford a tight fit on the end 59 of the handle 56. When mounted on the device 50 the bulb 58 overlaps on the handle 56 about ½ inch and forms an airtight seal.

In storage the handle 56 is filled with cleaning fluid, preferably windshield washing fluid, and the squeeze bulb 58 is fitted in place over the end of the handle. The only opening of the reservoir is at the end of the capillary tube which is directed toward the surface of the sponge. Being otherwise sealed and of rigid and semi-rigid materials, surface tension of the fluid and the internal pressure in the reservoir prevent the fluid from inadvertently leaking out of the capillary tube 53.

In use fluid is forced out of the reservoir by holding the device 50 with the end of the squeeze bulb 58 pointing upwardly with respect to the head, and squeezing the bulb.

The foregoing description of the invention has been presented only for illustration and description, and is not intended to be exhaustive or to limit the invention. Many modifications and variations will be apparent to those of ordinary skill in the art.

It is intended that the scope of the invention be limited not by the detailed description set forth above, but rather by the claims appended hereto.

What is claimed is:

1. Apparatus for the cleansing of windshield wiper blades, comprising an absorbent material having opposed ends;

a segment of tubing partially flattened into an oval with open opposite ends; and a lengthwise opening formed in said segment, the flattened oval shape compressing said absorbent material such that said opposed ends are folded over into abutting relationship and extending along the length of said tubing and said absorbent material having a V-shaped groove formed by the folding of said opposed ends for simultaneously contacting an edge and sides of said wiper blade when inserted through said lengthwise opening.

2. Apparatus as defined in claim 1 wherein said absorbent material is a sponge held securely within said segment by friction between an outer wall surface of said sponge and an inner wall of said segment to hold said sponge in place during storage and use, allowing easy removal and replacement of the cleaning surface of said sponge when contaminated or damaged.

3. Apparatus as defined in claim 1 wherein a length of soft, non-abrasive material selected from the class of self-adhesive felts and equivalents is attached to said segment opposite said lengthwise opening to avoid scratching a windshield when there is contact of a wiper blade with said segment against said windshield.

4. Apparatus as defined in claim 1 wherein a removable handle is formed from thin-walled tubing that is securely attached to said segment to serve both as a handle allowing remote access to the blade being cleaned and providing a storage compartment for a dropper.

5. Apparatus as defined in claim 1 wherein said absorbent material is a blade cleaning material, said segment is a holder with ends compressing said blade cleaning material, and further including means for remotely controlling said holder.

6. Apparatus as defined in claim 5 for cleaning windshield wiper blades wherein the remotely controlling means comprises a handle connected to said holder so that said blade cleaning material can manually be positioned against the windshield contacting area of a wiper blade and manipulated along the length of said wiper blade.

7. Apparatus as defined in claim 5 wherein said V-shaped grove is a compression formed groove for contacting a blade.

8. Apparatus as defined in claim 5 further including means on said holder for preventing scratching of a windshield upon contact with said holder.

9. Apparatus as defined in claim 5 wherein said blade cleaning material is removable and replaceable.

10. Apparatus as defined in claim 5 further including means for storing and dispensing fluid.

11. Apparatus as defined in claim 10 wherein the storage means comprises said means for remotely controlling said holder.

12. Apparatus as defined in claim 11 wherein said handle is hollow and a squeezable liquid dropper is formed to fit inside said handle.

13. Apparatus as defined in claim 12 wherein a cap prevents leakage and evaporation of fluid from within said dropper when not in use.

14. Apparatus as defined in claim 5 further comprising means for the temporary attachment of said device for storage.

15. Apparatus as defined in claim 1 for a windshield wiper blade cleaning device wherein said means for remotely controlling said holder is a hollow tubular handle connected to said casing to allow said casing to be positioned on a windshield and be manually manipulated along the length of a wiper blade with said cleaning surface under and contacting the normal windshield contacting area of the wiper blade; and further including a section of soft material attached to the underside of said casing to prevent scratching of a windshield upon contact with said casing.

16. Apparatus as defined in claim 15 wherein said cleaning material is removable from said casing and replaceable.

17. Apparatus as defined in claim 15 further including a squeeze-type dropper stored within said handle comprising a. a segment of flexible, hollow tube of slightly lesser length and diameter than said handle;

b. a dropper-type nipple attached to one end of said tube;

c. a plug inserted in the opposite end of said tube sealing said end of said tube and causing the diameter of said tube to be flared out at said end; and d. a removable cap to cover the opening in said nipple and prevent leakage and evaporation through said nipple when not in use.

18. Apparatus as defined in claim 15 further including a semi-rigid pen-type clip mounted onto said handle for use in temporarily attaching said device to an object during storage.

* * * * *